United States Patent [19]
Kim

[11] Patent Number: 6,041,201
[45] Date of Patent: Mar. 21, 2000

[54] APPARATUS FOR FILTERING SOLVENT OF LIQUID ELECTROPHOTOGRAPHIC PRINTER

[75] Inventor: Jong-Woo Kim, Yongin, Rep. of Korea

[73] Assignee: Samsung Electronics Co., Ltd., Kyungki-do, Rep. of Korea

[21] Appl. No.: 09/262,847

[22] Filed: Mar. 5, 1999

[30] Foreign Application Priority Data

Mar. 6, 1998 [KR] Rep. of Korea .................. 98-7521

[51] Int. Cl.[7] .................................................. G03G 21/20
[52] U.S. Cl. ........................... 399/93; 399/98; 399/348; 422/177
[58] Field of Search .................. 399/93, 98, 343, 399/348, 355; 422/177, 180

[56] References Cited

U.S. PATENT DOCUMENTS 4,549,399 10/1985 Usui et al. ............................... 60/286

FOREIGN PATENT DOCUMENTS 63-118507 5/1988 Japan .

*Primary Examiner*—Matthew S. Smith
*Assistant Examiner*—Hoang Ngo
*Attorney, Agent, or Firm*—Sughrue, Mion, Zinn, Macpeak & Seas, PLLC

[57] ABSTRACT

In an apparatus for filtering a solvent of a liquid electrophotographic printer, an exhaust fan exhausts air inside a main body of the printer to the outside thereof. A platinum catalyst filter is installed on a flow route of air exhausted by the exhaust fan and filters solvent included in the exhausted air. A heater selectively heats the platinum catalyst filter, and the solvent collected by the filter is decomposed. Thus, the filter can be reused and generation of waste can be prevented.

4 Claims, 2 Drawing Sheets

APPARATUS FOR FILTERING SOLVENT OF LIQUID ELECTROPHOTOGRAPHIC PRINTER

BACKGROUND OF THE INVENTION

1. Field of the Invention

The present invention relates.to an apparatus for filtering a solvent included in air inside a main body of a liquid electrophotographic printer.

2. Description of the Related Art

In a liquid electrophotographic printer, for example, a color printer, ink which is a mixture of liquid norpar ($C_{12}H_{26}$) that is a solvent and toner in a solid phase is used for printing. That is, when the ink is supplied to a photoreceptor belt where an electrostatic latent image is formed, the toner adheres to the photoreceptor belt according to the electrostatic latent image to form a predetermined image. Here, a small amount of the solvent remaining on the photoreceptor belt together with the toner is vaporized by a drying unit and is collected by a solvent collection system.

FIG. 1 shows a solvent collection system of a liquid electrophotographic printer. Referring to the drawing, a drying unit includes a drying roller 22 contacting a photoreceptor belt 14 and absorbing a liquid solvent therefrom, a heating roller 23 for vaporizing the absorbed solvent by heating the drying roller 22, and a manifold 21 housing the drying roller 22 and the heating roller 23.

The solvent adhering the photoreceptor belt 14 is absorbed by the drying roller 22 and vaporized by the heating roller 23. The vaporized solvent is temporarily contained inside the manifold 21. Since fins 21a for heat exchange are formed at the outer surface of the manifold 21, part of the vaporized solvent is condensed on the inner surface of the manifold 21 due to heat exchange with outside air and then is collected into a cartridge 26 via a first collection pipe 25.

The remaining solvent in a gas phase flows to a condensation receptacle 28 along a supply line 27 by the operation of a supply fan 29. The gaseous solvent flowing into the condensation receptacle 28 is liquefied by heat exchange with liquid solvent 28a contained in the condensation receptacle 28. When the level of the solvent in the condensation receptacle 28 rises due to condensation of the gaseous solvent, part of the solvent is collected into the cartridge 26 via a second collection pipe 31.

Also, the gaseous solvent that is not condensed in the condensation receptacle 28 flows into a filtering apparatus via a line L2 by the operation of an exhaust fan 33 and is filtered by a filter 34 of the filtering apparatus.

An exhaust line L1 is a route for exhausting air to prevent an excessive increase in the temperature of a printing unit 11 in a main body 10 during printing. The air exhausted along the line L1 is also filtered by the filter 34 so that solvent possibly remaining inside the main body 10 can be filtered.

Reference numeral 30 indicates a Peltier chip for maintaining the temperature inside the condensation receptacle 28. Reference numeral 32 indicates a moisture separation unit for separating moisture from the liquefied solvent 28a stored in the condensation receptacle 28 and storing the separated moisture.

Conventionally, a carbon filter such as activated charcoal is used as the filter 34. However, since the carbon filter easily loses its filtering capacity by repeated filterings, it is inconvenient to frequently exchange the carbon filters. Further, disposal of filtered solvent together with the filter causes pollution problems.

SUMMARY OF THE INVENTION

To solve the above problems, it is an objective of the present invention to provide an apparatus for filtering a solvent of a liquid electrophotographic printer having an improved structure in which the filtered solvent is decomposed so that the filter can be reused.

Accordingly, to achieve the above objective, there is provided an apparatus for filtering a solvent of a liquid electrophotographic printer, which comprises: an exhaust fan for exhausting air inside a main body of the printer to the outside thereof; a platinum catalyst filter installed on a flow route of air exhausted by the exhaust fan for filtering solvent included in the exhausted air; and a heater for selectively heating the platinum catalyst filter.

It is preferred in the present invention that a hollow cylinder is formed in the platinum catalyst filter and the heater is installed in the hollow cylinder.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
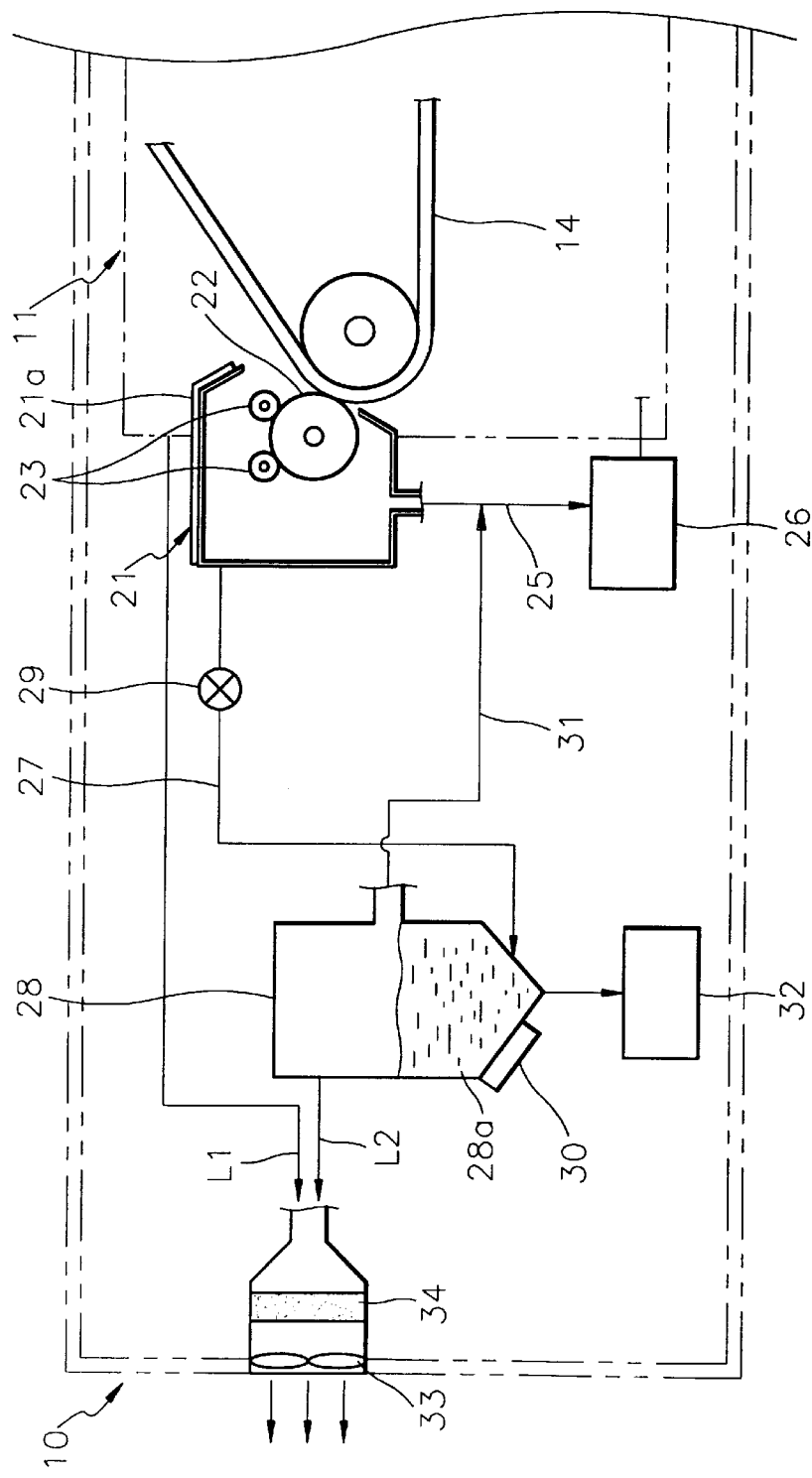
FIG. 1 is a view showing a solvent collection system of a conventional liquid electrophotographic printer.
Figure 2:
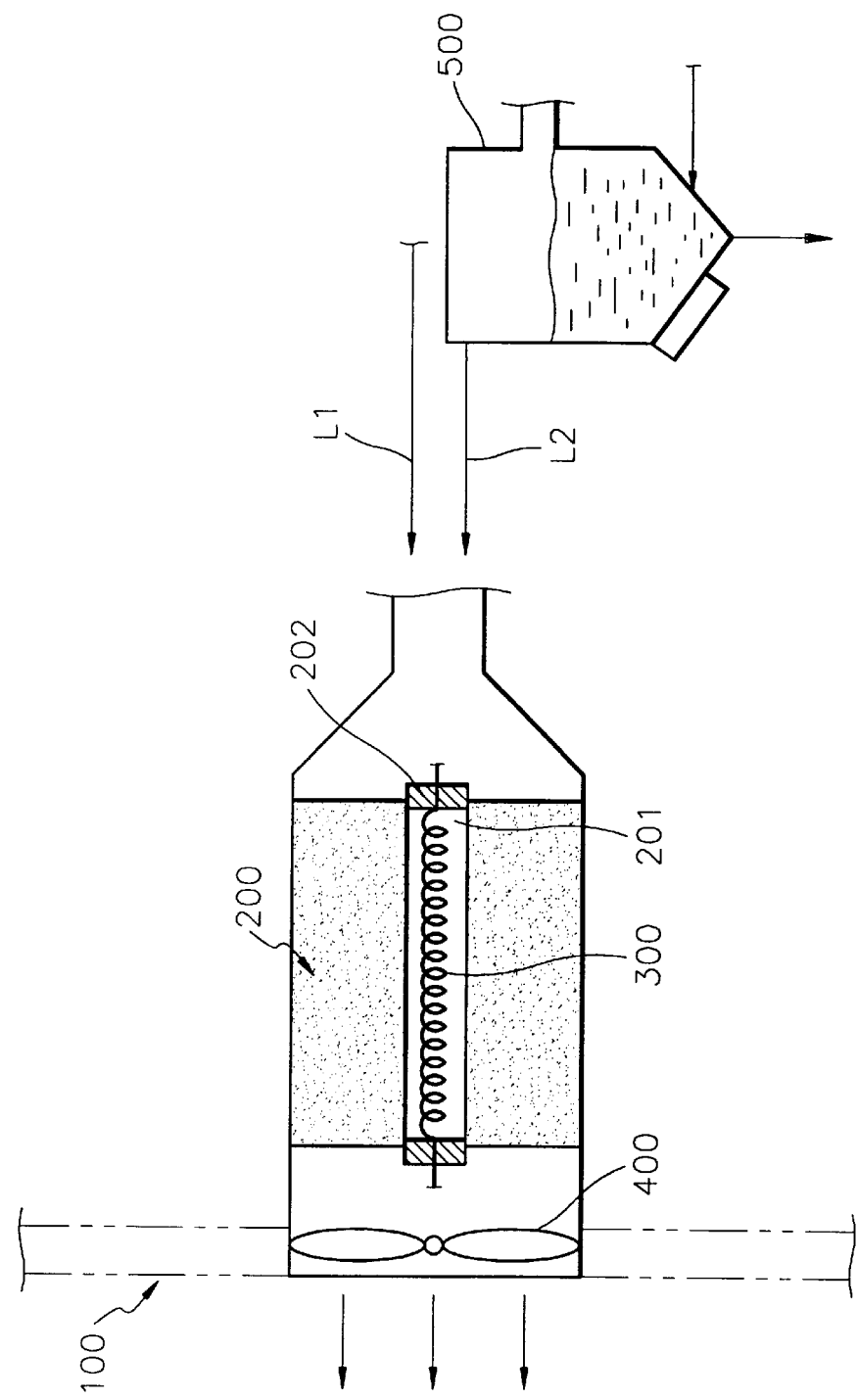
FIG. 2 is a view showing an apparatus for filtering a solvent according to the present invention.

In FIG. 2, the exhaust lines labeled L1 and L2 correspond to the exhaust lines labeled and L1 and L2 in FIG. 1, respectively.

As shown in FIG. 2, a condensation receptacle 500 is installed inside the main body 100 of a printer. An exhaust fan 400 for exhausting air from the inside of the main body 100 is installed at the main body 100. A platinum catalyst filter 200 for collecting solvent included in the air exhausted by the operation of the exhaust fan 400 is installed on an exhaust route. The platinum catalyst filter 200 is a filter coated with platinum as a catalyst. When the filter 200 is heated, the filtered solvent is easily decomposed by the catalyst reaction of platinum.

A hollow cylinder 201 is formed in the middle of the filter 200 and a heater 300 for heating the filter 200 is installed in the hollow cylinder 201. Reference numeral 202 indicates a cover closing both ends of the hollow cylinder 201.

In the operation of the solvent filtering apparatus having the above structure, during printing, the draws fan 400 exhausts air from the inside of the condensation receptacle 500 and from the main body 100 outside the main body 100 and exhausts the air. Here, the filter 200 filters the solvent, i.e, norpar ($C_{12}H_{26}$), included in the exhausted air.

When the amount of solvent filtered by the filter 200 increases due to continued printing for several hours, the heater 300 operates to heat the filter 200. The solvent is thermally decomposed according to the following chemical formula.

$$2C_{12}H_{26} + 37O_2 \rightarrow 2(12CO_2 + 13H_2O)$$

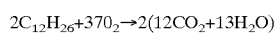

The above thermal decomposition is easily generated at a relatively low heating temperature due to a catalytic action of platinum. That is, although the solvent should be generally heated at a high temperature over 400° C. to be decomposed, thermal decomposition is generated at about 200° C. when a platinum catalyst is used. To apply the above thermal decomposition to the conventional carbon filter, the carbon filter would need to be heated to above about 400° C. However, since the carbon filter burns at this temperature, the application of the thermal decomposition is not possible.

The thermally decomposed $CO_2$ and $H_2O$ gases are exhausted to the outside by the exhaust fan 400. Thus, the filtering capacity of the filter 200 is replenished by the thermal decomposition of the solvent.

As described above, according to the apparatus for filtering a solvent of a liquid electrophotographic printer according to the present invention, since the solvent collected by the filter is removed by thermal decomposition, the filter can be reused. Thus, a periodic exchange of the filter as in the conventional technology is not needed. Accordingly, generation of waste can be prevented.

What is claimed is:

1. An apparatus for filtering a solvent of a liquid electrophotographic printer, said apparatus comprising:

an exhaust fan for exhausting air inside a main body of said printer to the outside thereof;

a platinum catalyst filter installed on a flow route of air exhausted by said exhaust fan for filtering solvent included in the exhausted air; and a heater for selectively heating said platinum catalyst filter, wherein a hollow cylinder is formed in said platinum catalyst filter and said heater is installed in said hollow cylinder.

2. The apparatus as claimed in claim 1, wherein said platinum catalyst filter is heated to a temperature of approximately 200° C.

3. The apparatus as claimed in claim 1, wherein said heater generates thermal decomposition of said solvent collected in said platinum catalyst filter.

4. An apparatus for filtering a solvent of a liquid electrophotographic printer, said apparatus comprising:

an exhaust fan for exhausting air inside a main body of said printer to the outside thereof;

a platinum catalyst filter installed on a flow route of air exhausted by said exhaust fan for filtering solvent included in the exhausted air; and a heater for selectively heating said platinum catalyst filter, wherein said heater is installed in said platinum catalyst filter.

* * * * *